United States Patent
Loehken

(10) Patent No.: US 9,038,256 B2
(45) Date of Patent: May 26, 2015

(54) FORMING COMPONENTS MADE OF CAST MATERIALS

(71) Applicant: Georg Fischer Automotive AG, Schaffhausen (CH)

(72) Inventor: Thomas Loehken, Constance (DE)

(73) Assignee: Georg Fischer Automotive AG, Schaffhausen (CH)

( * ) Notice: Subject to any disclaimer, the term of this patent is extended or adjusted under 35 U.S.C. 154(b) by 0 days.

(21) Appl. No.: 14/096,125

(22) Filed: Dec. 4, 2013

(65) Prior Publication Data

US 2014/0157848 A1    Jun. 12, 2014

(30) Foreign Application Priority Data

Dec. 11, 2012 (EP) .................................. 12196460

(51) Int. Cl.
| | |
|---|---|
| B21D 26/14 | (2006.01) |
| B23P 11/02 | (2006.01) |
| B21D 26/06 | (2006.01) |
| B21J 5/00 | (2006.01) |
| B21J 5/06 | (2006.01) |

(52) U.S. Cl.
CPC .............. B21D 26/14 (2013.01); B23P 11/025 (2013.01); B21D 26/06 (2013.01); B21J 5/002 (2013.01); B21J 5/06 (2013.01)

(58) Field of Classification Search
CPC ........ B21D 26/14; B21D 26/06; B23P 11/025
USPC ......................... 72/54, 56, 430, 707; 29/419.2
See application file for complete search history.

(56) References Cited

U.S. PATENT DOCUMENTS

| | | | |
|---|---|---|---|
| 5,730,016 A | 3/1998 | Zittel | |
| 6,968,718 B2 | 11/2005 | Imamura | |
| 2012/0187738 A1* | 7/2012 | Gross et al. | ....................... 72/54 |

FOREIGN PATENT DOCUMENTS

| | | |
|---|---|---|
| EP | 1380364 A1 | 1/2004 |
| WO | 2011032691 A1 | 3/2011 |

OTHER PUBLICATIONS

Lindholm U.S. et al: "Effect of strain rate on yield strength, tensile strength, and elongation of three aluminum alloys", XP002696506, Database accession No. 270645 & Journal of Materials USA, Bd. 6, Nr. 1, Marz 1971 (Mar. 1971) p. 17.
"ICHSF 2004 1st International Conference on High-Speed Forming" XP002696507, Database accession No. 8097147, Mar. 31-Apr. 1, 2004, Dortmund, Germany, ISBN: 3-00-012970-7.
LS-DYNA Users' Forum, Bamberg 2008, Metalforming II, "Superplatische Blechumformung von Magnesiumlegierungen".
European Search Report for Application No. 12196460.5 dated May 3, 2013.

* cited by examiner

Primary Examiner — David B Jones
(74) Attorney, Agent, or Firm — Bachman & LaPointe, P.C.

(57) ABSTRACT

Method for non-destructively forming a component made of cast material beyond the quasistatic elongation at break, wherein the component is formed by means of electromagnetic high-speed forming (EMF) method.

12 Claims, No Drawings

FORMING COMPONENTS MADE OF CAST MATERIALS

BACKGROUND OF THE INVENTION

The invention relates to a method for non-destructively forming a component made of cast material beyond the quasistatic elongation at break.

It is known that casting as a primary forming method affords large degrees of freedom with respect to shaping, functional integration and material selection. Essentially, a change from starting material to raw product is obtained in a single manufacturing step. Nevertheless, it can be favorable to subsequently perform a forming step, for example for producing undercuts or for creating clamped connections. On account of the relatively high brittleness of cast materials, to date there have been no known approaches for further processing cast components by forming.

In general terms, the elongation at break of cast materials does not reach the order of magnitude of, for example, extruded products. Materials predestined for forming are distinguished by elongations at break which generally exceed 20%. By contrast, the elongation at break of cast materials, depending on the alloy and casting method, is often only between 1% (AlSi9Cu3) and 4% (AlSi7Mg). These are in no way sufficient for forming, and cracks or fractures would arise long before a useful degree of forming is achieved. Therefore, materials of this kind have hitherto not been suitable for forming.

One conceivable method for achieving higher elongations at break would be the use of superplastic shaping, which is disclosed in the conference report of the LS-Dyna Users' Forum, Bamberg 2008. However, this presupposes both extremely low forming rates ($\approx 10^{-4} s^{-1}$) and strong heating ($>0.5*T_m$). Here, $T_m$ is to be understood as meaning the melting point of the material on the absolute temperature scale. These boundary conditions require both long process times and a high outlay of energy, which often makes the use of these methods uneconomical.

It is also known, however, that a higher elongation at break usually also accompanies an increasing strain rate in a forming method in metals. However, this effect is all the more pronounced the greater the purity of the materials, and decreases greatly in the case of alloys [Lindholm, U.S. Journal of Materials 6, 1971 (1)]. The hydraulic methods used for materials science investigations [Proceedings of the 1st International Conference on High Speed Forming ICHSF, Dortmund, 2004) or even explosive approaches for generating high strain rates are scarcely suitable for non-destructive forming in series production, since these methods cannot be integrated economically into production processes.

It is an object of the invention to use a method which makes it possible to form cast materials at moderate temperatures of below 150° C.

SUMMARY OF THE INVENTION

According to the invention, this object is achieved in that the cast material is formed by means of electromagnetic high-speed forming (EMF).

DETAILED DESCRIPTION

EMF, which is prior art, has not been used to date for cast materials, since there is a prevailing preconception that cast materials cannot be formed non-destructively. On the one hand, the method generates the very high strain rates which are required, and on the other hand the method can also be employed flexibly under production conditions.

The strain rates which can be generated by the EMF method are in the range of 100 1/s to several 10 000 1/s, with an as far as possible isotropic development of force. Optimum deformations of the components are preferably achieved with a strain rate of more than 1000 1/s as well as with a strain rate of more than 10 000 1/s.

The isotropic development of force is of major importance inasmuch as other mechanical methods would quickly lead to the non-uniform deformation of the components and therefore to local failure of the components or of the material from which the components are produced.

A preferred configuration consists in the use of a cast material having an elongation at break of less than 20% for the component to be formed. Components which are made from such cast materials cannot be formed to a sufficient extent by other forming methods, since they increasingly tend towards cracking.

A form-fitting connection to at least one further component is achieved by the forming of the component made of a cast material. The component which is produced from a cast alloy is arranged, for example, on a further component which can but does not have to be produced from the same material. The subsequent use of the EMF method achieves a form-fitting connection which causes no integral bond. That is to say, the two materials do not amalgamate or do not merge into one another, as is the case in a welding operation.

Similarly, a force-fitting connection to at least one further component is achieved by the forming of the component made of a cast material by the EMF method. After the components have been joined together, for example by loosely placing them on top of one another or by inserting them into one another, the use of the EMF method achieves a force-fitting connection without an integral bond between the components.

In a further expedient use of the EMF method, an individual cast component is brought into the final shape by the forming. As a result, it can be possible, for example, to produce parts which would otherwise not be removable from the mould on account of undercuts.

Furthermore, the method can also be used expediently to utilize a local increase in strength of the base material which is brought about by the strong material deformation.

The EMF method is particularly suitable for forming cast aluminium alloys as well as for cast magnesium alloys. In this respect, it is expedient and necessary to adapt the forming parameters to the specific material properties. This can be done, for example, by setting the electromagnetic force-time progression, which is determined substantially by charging energy, capacitor capacitances and coil inductance.

Investigations on which the present invention is based have shown that said electromagnetic high-speed forming makes it possible to achieve elongations of up to 30% on necking of cast tubes made of, for example, AlSi7Mg, without discernible cracking.

However, the invention is not limited to the aforementioned alloys or tubular components. It was also possible to verify similar increases in the elongation values in other alloys and designs. The invention can therefore also be used, for example, for an iron alloy.

The invention claimed is:

1. A method for non-destructively forming a component made of cast material beyond the quasistatic elongation at break, comprising forming the component by electromagnetic high-speed forming (EMF) so as to non-destructively form a cast component beyond the quasistatic elongation at break, wherein a form-fitting connection to at least one further component is made by the forming of the component made of a cast material.

2. Method according to claim 1, wherein the strain rate of the EMF method is higher than $100\ s^{-1}$.

3. Method according to claim 1, wherein the strain rate of the EMF method is higher than $1000\ s^{-1}$.

4. Method according to claim 1, wherein the strain rate of the EMF method is higher than $10\,000\ s^{-1}$.

5. Method according to claim 1, wherein the cast material is an aluminium alloy.

6. Method according to claim 1, wherein the cast material is a magnesium alloy.

7. Method according to claim 1, wherein the cast material is an iron alloy.

8. Method according to claim 1, wherein the cast material has an elongation at break of less than 20%.

9. Method according to claim 1, wherein the cast material has an elongation at break of less than 15%.

10. Method according to claim 1, wherein the cast material has an elongation at break of less than 10%.

11. Method according to claim 1, wherein the cast material has an elongation at break of less than 5%.

12. Method according to claim 1, wherein the process temperature for the forming is less than $0.5 * T_m$ of the formed material, where $T_m$ is the melting point of the material.

\* \* \* \* \*